(12) United States Patent
McWhirter

(10) Patent No.: US 12,102,265 B2
(45) Date of Patent: Oct. 1, 2024

(54) HERB GRINDING DEVICE

(71) Applicant: Kyle McWhirter, Kailua-Kona, HI (US)

(72) Inventor: Kyle McWhirter, Kailua-Kona, HI (US)

(73) Assignee: Shreddah LLC

( * ) Notice: Subject to any disclaimer, the term of this patent is extended or adjusted under 35 U.S.C. 154(b) by 42 days.

(21) Appl. No.: 17/699,135

(22) Filed: Mar. 20, 2022

(65) Prior Publication Data
US 2023/0292958 A1 Sep. 21, 2023

(51) Int. Cl.
*A47J 42/26* (2006.01)
*A47J 42/30* (2006.01)

(52) U.S. Cl.
CPC .............. *A47J 42/26* (2013.01); *A47J 42/30* (2013.01)

(58) Field of Classification Search
CPC .......... A47J 42/26; B02C 18/08; B02C 18/12; B02C 18/18; B02C 18/24
See application file for complete search history.

(56) References Cited

U.S. PATENT DOCUMENTS

| | | | |
|---|---|---|---|
| 3,434,518 A * | 3/1969 | Motis ...................... | B02C 18/12 241/199.12 |
| 6,830,206 B2 | 12/2004 | Yang | |
| 8,393,563 B2 | 3/2013 | Chaoui et al. | |
| 9,565,972 B1 | 2/2017 | Ormaza | |
| 10,343,175 B1 | 7/2019 | Abehasera | |
| 10,478,825 B2 | 11/2019 | Mroue | |
| 10,966,571 B1 | 4/2021 | Barrett et al. | |
| 2014/0261471 A1 | 9/2014 | Ruzycky | |
| 2016/0106262 A1 * | 4/2016 | Mroue ...................... | B02C 23/10 241/79 |
| 2018/0126386 A1 * | 5/2018 | Witko ...................... | B02C 18/16 |
| 2019/0150666 A1 | 5/2019 | Wozniak et al. | |
| 2019/0269277 A1 | 9/2019 | Larose | |

OTHER PUBLICATIONS

Electric-Herb-Grinder-Large-3.4oz-USB, retrieved date Mar. 16, 2023. https://www.amazon.com/beerfingo-SRO1-Electric-Grinder-3-5-Inch-2022-Upgraded/dp/B09MF493VG.*
VRUPINZE Electric Herb Grin, retrieved date Mar. 16, 2023. https://www.amazon.com/VRUPINZE-Electric-Grinders-Grinding-Including/dp/B09QMPNY6K?th=1.*

* cited by examiner

*Primary Examiner* — Matthew Katcoff
*Assistant Examiner* — Mohammed S. Alawadi

(57) ABSTRACT

An herb grinding device for no jamming grinding of herb and other plant material is presented. The herb grinding device, provides for a battery-operated grinder for marijuana and similar herb products. The invention takes a form of an overall cylindrical enclosure that is approximately forty-eight millimeters (48 mm.) high and sixty-three millimeters (63 mm.) high. The overall cylindrical enclosure comprises a battery/motor compartment at the lower portion of the device, a grinding compartment in the middle of the device and a cover at the top of the device. Further description of the battery/motor compartment, the grinding compartment, and the cover will be provided herein below. It is envisioned that the overall cylindrical enclosure would be made of stainless steel for durability, easy of cleaning and sanitization, and durability.

16 Claims, 5 Drawing Sheets

HERB GRINDING DEVICE

FIELD OF THE INVENTION

This invention relates to grinding of plant material. More particularly, it relates to a device with a power source for grinding herb and other like plant material.

BACKGROUND

An herb grinder (or simply, a grinder) is a cylindrical device with two halves (top and bottom) that separate and have sharp teeth or pegs aligned in such a way that when both halves are turned, material inside is shredded. Though the manufacturers claim they are intended for use with herbs and spices for cooking, they are often used to shred *cannabis*, and are often unsuitable for actual use with spices (which instead are prepared using a burr grinder), resulting in a product that can be more easily hand-rolled into a "joint" that burns more evenly. Herb grinders are typically made of either metal or plastic and come in a variety of colors and polished metals.

Some grinders have two or three compartments instead of just one, with fine screens separating the bottom compartments from the ones above, thus allowing the marijuana trichomes, also called kief, to be collected separately.

The widespread adoption of *cannabis* as a recreational drug in recent times has caused herb grinders to become synonymous with weed grinders. There are many types of herb grinders out there, from electric to hand cranked, in various styles. Advertisements describing them as "spice grinders" have sometimes confused buyers who were unaware about the actual intended use.

There are problems with the design of herb grinders that exists today. With the conventional grinder teeth in the current herb grinder, herbs get stuck and must be removed manually to continue grinding. Manual twisting is required for most herb grinders, and this results in a hindrance for people to use if hand mobility (arthritis, tendonitis, etc.), is restricted.

Accordingly, and in light of the foregoing, it would be desirable to have an herb grinder that is battery powered and requires no manual twisting to grind herbs effectively and efficiently. Also, it would be desirable for the device to prevent no jamming with the herbs and a device that is easily cleanable after use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
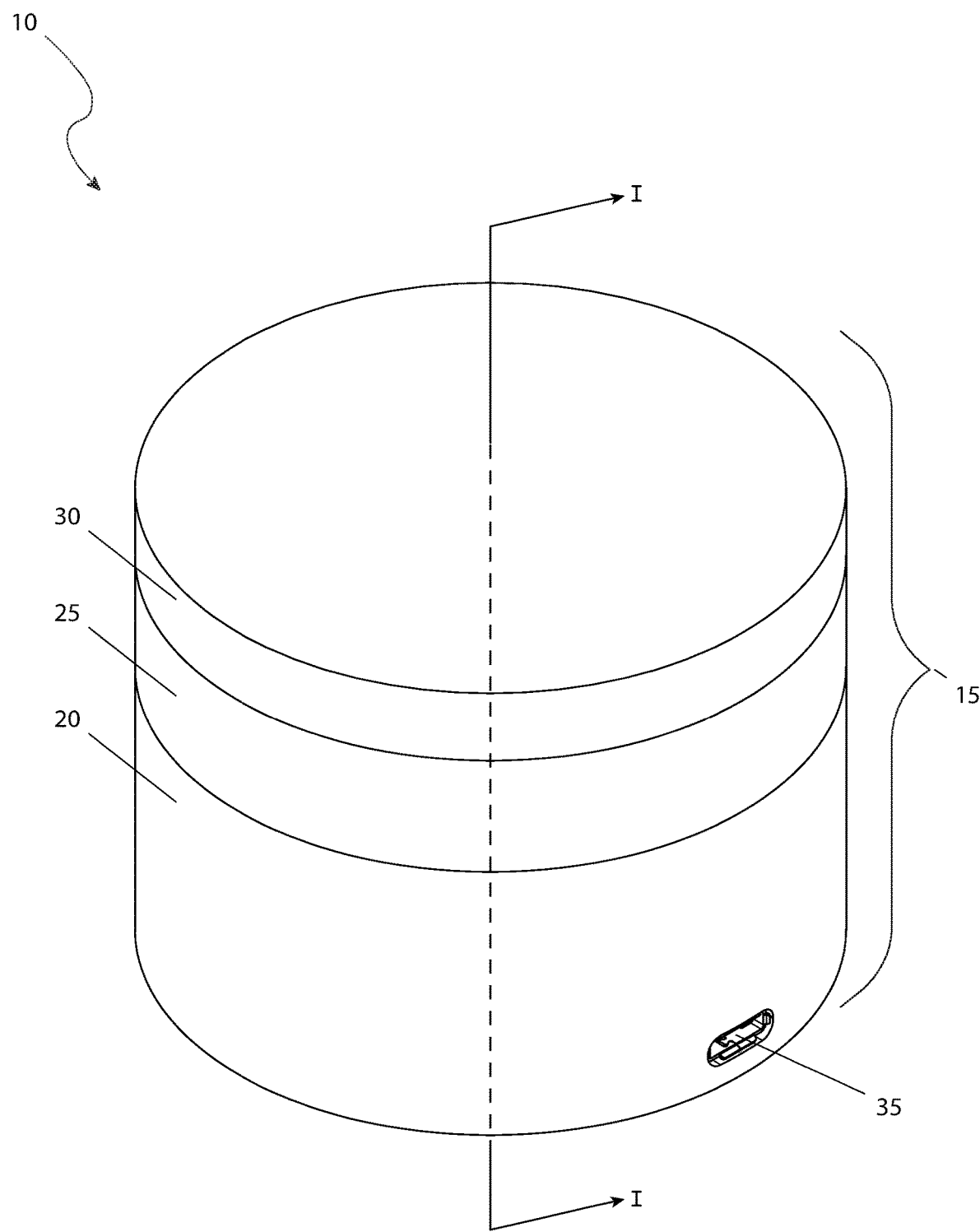
FIG. 1 is a perspective view of the herb grinding device 10, according to the preferred embodiment of the present invention.

10 herb grinding device
15 overall cylindrical enclosure
20 battery/motor compartment
25 grinding compartment
30 cover
35 charging jack
40 rechargeable battery
45 motor
50 shaft
55 guide bearing
60 grinding blade
65 rubber mount
70 screen
75 retaining bowl
80 twist lock connection
85 downward motion "d"
90 pressure switch
95 circular rotation
100 charge controller

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the herb grinding device 10, according to the preferred embodiment of the present invention is disclosed. The herb grinding device 10 (herein also described as the "device") 10, provides for a battery-operated grinder for marijuana and similar herb products.

The invention takes a form of an overall cylindrical enclosure 15 that is approximately forty-eight millimeters (48 mm.) high and sixty-three millimeters (63 mm.) high-long. The overall cylindrical enclosure 15 comprises a battery/motor compartment 20 at the lower portion of the device 10, a grinding compartment 25 in the middle of the device 10 and a cover 30 at the top of the device 10. Further description of the battery/motor compartment 20, the grinding compartment 25, and the cover 30 will be provided herein below. It is envisioned that the overall cylindrical enclosure 15 would be made of stainless steel for durability, easy of cleaning and sanitization, and durability. However, other materials of construction such as plastic may also be considered as materials of construction. As such, the use of any specific materials to build the device 10, should not be interpreted as a limiting factor of the present invention. Finally, a micro-USB charging jack 35 is located in the battery/motor compartment 20 for purposes of charging the device 10.

Figure 2:
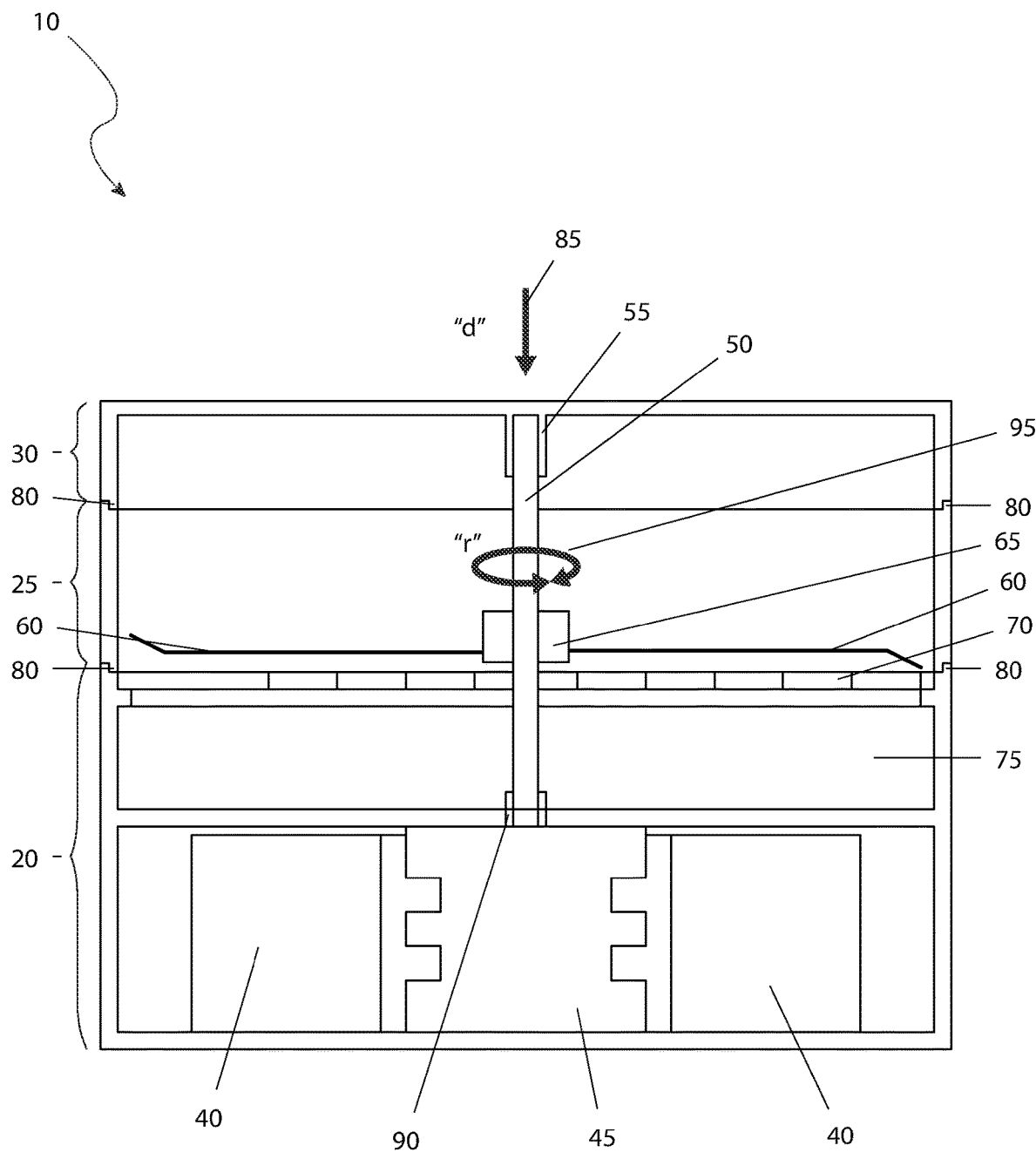
FIG. 2 is a sectional view of the herb grinding device 10, as seen along a line I-I, as shown in FIG. 1, according to the preferred embodiment of the present invention.

Referring next to FIG. 2, a sectional view of the device 10, as seen along a line I-I, as shown in FIG. 1, according to the preferred embodiment of the present invention is depicted. The battery/motor compartment 20 contains at least two (2) rechargeable batteries 40 arranged around a centrally mounted motor 45. A shaft 50 extends upward through the grinding compartment 25 and the cover 30, where it terminates in a guide bearing 55. Three (3) grinding blades 60 (of which only two (2) are shown due to illustrative limitations) are mounted in a tight rubber mount 65 which allows the grinding blades 60 to be removed for replacement or cleaning. Different sizes or styles of grinding blades 60 may be used depending on the grinding outcome desired. Grinding action of the grinding blades 60 occur against a screen 70, envisioned to be made of stainless steel. Small particles that result from the grinding process fall through into a retaining bowl 75. The interconnection between the battery/motor compartment 20 and the grinding compartment 25 and the grinding compartment 25 and the cover 30 is made via a twist lock connection 80. The twist lock connection 80 allow the interconnected components to remain together during operation of the device 10. As the connection of the twist lock connection 80 is made, downward motion "d" 85 is generated upon the cover 30. This motion is then transferred through the shaft 50 to a pressure switch 90 located above the motor 45. As the pressure switch 90 is activated, the motor 45 is energized to produce a circular rotation (r) 95 about the shaft 50 and the grinding blades 60.

Figure 3:
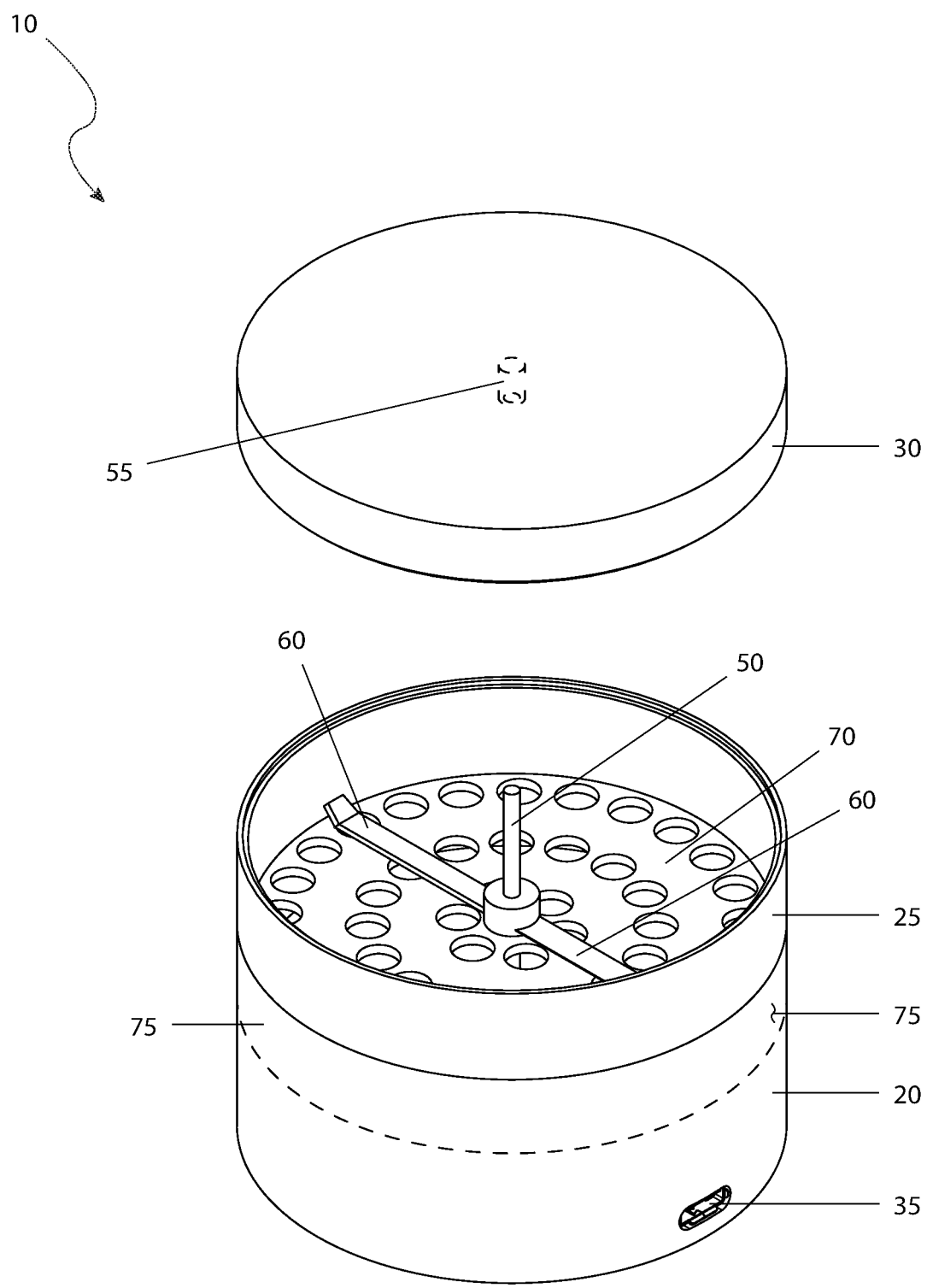
FIG. 3 is an exploded parts view of the herb grinding device 10, according to the preferred embodiment of the present invention.

Referring now to FIG. 3, an exploded parts view of the herb grinding device 10, according to the preferred embodiment of the present invention is shown. The cover 30 is shown removed, thus exposing a grinding area bordered by the screen 70 on the bottom, the underside of the cover 30 on the top and on the sides by the interior of the grinding compartment 25 and the cover 30. The guide bearing 55 provides stability for the shaft 50 while it is rotating. It is noted that the grinding blades 60 are of a dull nature to produce a grinding action in lieu of a cutting action. The retaining bowl 75 is shown via dashed lines, due to its hidden nature, in the battery/motor compartment 20, but accessible for emptying or cleaning when the grinding compartment 25 is removed via the twist lock connection 80 (as shown in FIG. 2). The charging jack 35 remains visible.

Figure 4:
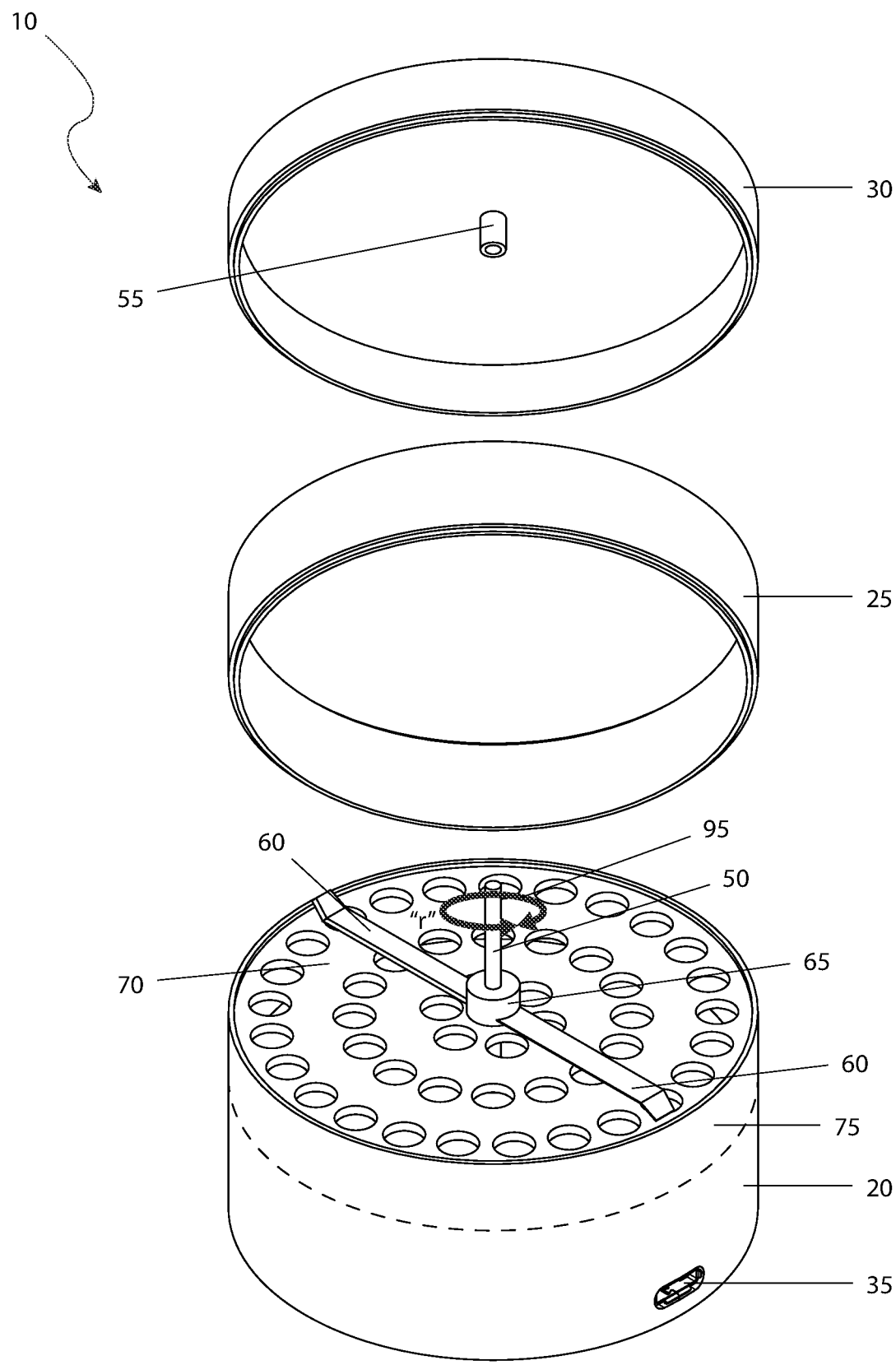
FIG. 4 is another exploded parts view of the herb grinding device 10, according to the preferred embodiment of the present invention; and, FIG. 5 is an electrical block diagram of the herb grinding device 10, according to the preferred embodiment of the present invention.

Referring next to FIG. 4, another exploded parts view of the device 10, according to the preferred embodiment of the present invention is disclosed. This view discloses the grinding compartment 25 in a removed state from the battery/motor compartment 20. However, it is noted that in order to remove the grinding compartment 25 from the battery/motor compartment 20, the grinding blades 60 and rubber mount 65 need to be removed as well. As such, the grinding blades 60 and the rubber mount 65 are thus replaced on the shaft 50 for illustrative purposes after the grinding compartment 25 was separated along the twist lock connection 80, as shown in FIG. 2. The underside of the screen 70 in the grinding compartment 25 is visible. Likewise, the guide bearing 55 is visible on the underside of the cover 30. The shaft 50 rotates along the circular rotation (r) 95 with the distal end of the shaft 50 being supported in the guide bearing 55. As before, the retaining bowl 75 remains visible (via hidden dashed lines) along with the charging jack 35 in the battery/motor compartment 20.

Figure 5:
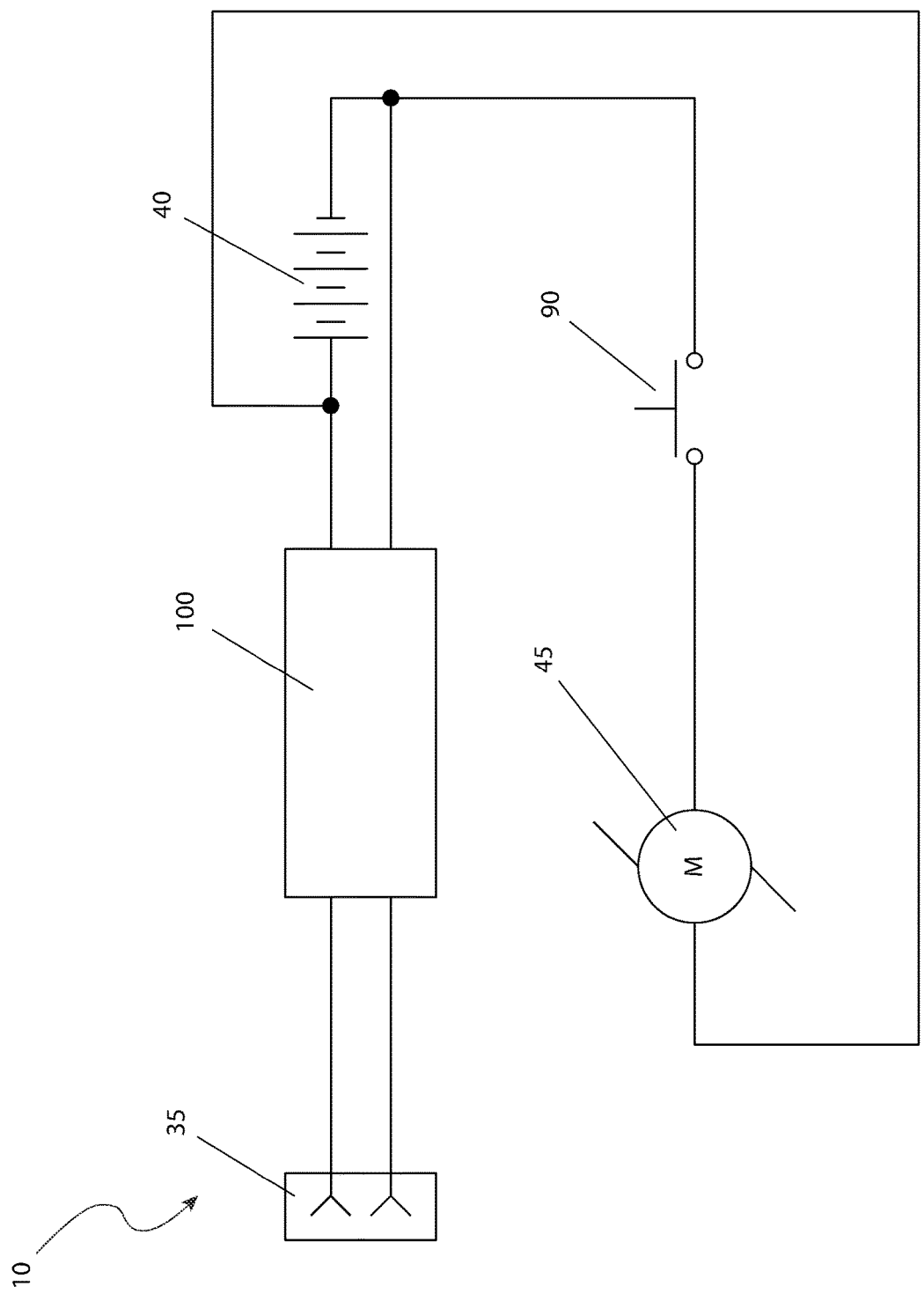

Referring to FIG. 5, an electrical block diagram of the device 10, according to the preferred embodiment of the present invention is depicted. Incoming electrical power enters via the charging jack 35. Incoming power is envisioned to be standard five-volts direct current (5.0 VDC) as generated by a standard micro-USB cable hooked up to a USB power supply. Power is then routed to a charge controller 100 to provide the necessary power to safely charge the rechargeable batteries 40. Power is then controlled via the pressure switch 90 to energized the motor 45 is a series connected circuit with the rechargeable batteries 40.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as home appliance stores, discount stores, department stores, smoke shops, mail order and internet supply houses and the like. Special attention would be paid to the overall configuration, size, and style of the grinding blades 60.

After procurement and prior to utilization, the device 10 would be prepared in the following manner: the rechargeable batteries 40 would be charged by connection of a proper power source to the charging jack 35. At this point in time, the device 10 is ready for use.

During utilization of the device 10, the following procedure would be initiated: the cover 30 would be removed to expose the grinding compartment 25; the user would load the grinding compartment 25 with their preference of herbs where the grinding blades 60 are located above the screen 70. The cover 30 is then placed back on the grinding compartment 25 while ensure the shaft 50 engages the guide bearing 55; once ready the cover 30 is pushed down and engaged via the twist lock connection 80; said action will activate the pressure switch 90 and energize the motor 45 and grinding of the herbs will commence. After a suitable period of time, envisioned to be approximately five seconds (5 s.), the cover 30 will be disengaged thus deactivating the motor 45; ground herbs can be removed from above the screen 70. After repeated usage cycles, the grinding blades 60 and the rubber mount 65 can be removed from the shaft 50, and the grinding compartment 25 with the screen 70 removed, thus gaining access to the retaining bowl 75 for removal of fine ground herbs for consumption.

After use of the device 10, it is cleaned using soap and water and allowing it to dry such that it may be ready for use in a repeating and cyclical manner.

The features of the device 10 provide the following benefits: it is ideal for use with marijuana plants, it will be able to grind/shred herbs efficiently and effectively, no herbs will get stuck in conventional grinder teeth, no manual twisting of the grinder is required, no jamming of the grinder will occur, and the overall touch to start mechanism will feel natural to the touch.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An herb grinding device for grinding herb and other materials, the device comprising:
a cylindrical enclosure, the enclosure comprising:
a battery/motor compartment;
a cover; and
a grinding compartment, the grinding compartment has a shaft, the shaft extending through the grinding compartment and the cover and configured to terminate in a guide bearing, the grinding compartment configured between the battery/motor compartment of the cylindrical enclosure and the cover of the cylindrical enclosure, wherein the grinding compartment further comprising: three (3) grinding blades, the grinding blades being mounted in a tight rubber mount, wherein when the grinding blades are actuated, the grinding blades have a grinding action against a screen, wherein the screen covers a retaining bowl, wherein when a grinding process has occurred then small particles resulting from the grinding process fall through the screen into the retaining bowl, and wherein the retaining bowl is accessible by an interconnection between the battery/motor compartment, the grinding compartment and the cover being made by a twist lock connection.

2. The device according to claim 1, wherein the battery/motor compartment further comprising a charging jack.

3. The device according to claim 2, wherein the charging jack being a Universal Serial Bus (USB) charging jack.

4. The device according to claim 3, wherein the USB charging jack being a micro-USB charging jack.

5. The device according to claim 1, wherein the cylindrical enclosure having a length of sixty-three millimeters (63 mm).

6. The device according to claim 1, wherein the cylindrical enclosure having a height of forty-eight millimeters (48 mm).

7. The device according to claim 1, wherein the battery/motor compartment has at least two (2) batteries and a centrally mounted motor, wherein the motor being centrally mounted in the battery/motor compartment, and wherein the batteries being arranged around the centrally mounted motor.

8. The device according to claim 7, wherein the batteries provide a power of five volts direct current (5v DC).

9. The device according to claim 7, wherein the batteries are rechargeable.

10. The device according to claim 1, wherein the grinding blades being removable for cleaning or replacement.

11. The device according to claim 1, wherein the grinding blades are dull.

12. The device according to claim 1, wherein the screen is made of a stainless-steel material.

13. The device according to claim 1, wherein the twist lock connection is configured to allow for the battery/motor compartment, the grinding compartment and the cover to remain together during operation of the device.

14. The device according to claim 13, wherein when the twist lock is made, downward motion is generated upon the cover.

15. The device according to claim 1, wherein the downward motion is configured to be transferred through the shaft a pressure switch located above a motor of the battery/motor compartment.

16. The device according to claim 14, wherein when the pressure switch is activated the motor is energized to produce a circulate rotation about the shaft and the grinding blades.

* * * * *